US008881281B1

(12) United States Patent
Mitchell (10) Patent No.: US 8,881,281 B1
(45) Date of Patent: Nov. 4, 2014

(54) APPLICATION AND NETWORK ABUSE DETECTION WITH ADAPTIVE MITIGATION UTILIZING MULTI-MODAL INTELLIGENCE DATA

(71) Applicant: Singularity Networks, LLC, Burlingame, CA (US)

(72) Inventor: David James Mitchell, Burlingame, CA (US)

(73) Assignee: Singularity Networks, Inc., Burlingame, CA (US)

( * ) Notice: Subject to any disclaimer, the term of this patent is extended or adjusted under 35 U.S.C. 154(b) by 0 days.

(21) Appl. No.: 14/290,611

(22) Filed: May 29, 2014

(51) Int. Cl.
H04L 29/06 (2006.01)
G06F 21/55 (2013.01)

(52) U.S. Cl.
CPC .......... *H04L 63/1408* (2013.01); *G06F 21/552* (2013.01); *H04L 63/1458* (2013.01); *G06F 21/55* (2013.01); *H04L 63/14* (2013.01); *H04L 63/30* (2013.01); *G06F 21/554* (2013.01); *H04L 63/1425* (2013.01); *H04L 63/1466* (2013.01); *H04L 2463/145* (2013.01)
USPC .................. 726/23; 726/22; 726/24; 726/25; 709/217; 709/219; 709/224; 709/225; 709/229

(58) Field of Classification Search
CPC ......... G06F 21/55; G06F 21/56; H04L 63/14; H04L 63/16; H04L 63/20; H04L 63/30; H04L 2463/14
USPC ............................... 726/22–25; 709/217–229
See application file for complete search history.

(56) References Cited

U.S. PATENT DOCUMENTS

| | | | | |
|---|---|---|---|---|
| 7,062,782 | B1 * | 6/2006 | Stone et al. | 726/22 |
| 7,266,754 | B2 * | 9/2007 | Shah et al. | 714/776 |
| 7,458,094 | B2 * | 11/2008 | Jackson | 726/2 |
| 7,533,414 | B1 * | 5/2009 | Reed et al. | 726/22 |
| 2006/0123479 | A1 * | 6/2006 | Kumar et al. | 726/23 |
| 2007/0209074 | A1 * | 9/2007 | Coffman | 726/23 |
| 2010/0122342 | A1 * | 5/2010 | El-Moussa et al. | 726/22 |
| 2013/0198005 | A1 * | 8/2013 | Xiong et al. | 705/14.66 |

OTHER PUBLICATIONS

Proactively Detecting Distributed Denial of Service Attacks U sing Source IP Address Monitoring by Peng et al; Publisher: International Federation for Information Processing; Year: 2004.*
Detecting Distributed Denial-of-Service Attacks Using Kolmogorov Complexity Metrics by Kulkarni et al; Publisher: Springer Science+Business Media, Inc.; Year: 2006.*

* cited by examiner

*Primary Examiner* — Madhuri Herzog
(74) *Attorney, Agent, or Firm* — Sterne, Kessler, Goldstein & Fox PLLC (57) ABSTRACT

In an embodiment, a computer-implemented method detects a network or application abuse to a service provider environment. In the method, data is collected describing incoming requests from plurality of different external source addresses to the service provider environment. The collected data is used to compare the incoming requests against a heuristic. When the incoming requests are determined to match the heuristic, the requests, having the plurality of different external source addresses, are from a common abuse entity. Finally, the collected data is evaluated to determine that the common abuse entity is a potential network abuser of the service provider environment.

24 Claims, 6 Drawing Sheets

APPLICATION AND NETWORK ABUSE DETECTION WITH ADAPTIVE MITIGATION UTILIZING MULTI-MODAL INTELLIGENCE DATA

BACKGROUND

1. Field

This field is generally related to network security.

2. Related Art

A communication network may, for example, allow data to be transferred between two geographically remote locations. Networks are used, for example, to provide applications, such as web and other Internet-based applications, to users. Typically, these applications operate by receiving a request, such as an Hypertext Transfer Protocol (HTTP) request, and, based on the request, supplying a response. The request and response may be formatted in accordance with a known application program interface (application). The requests are generally transmitted via a public or private network, such as the Internet or an internal network, to the service provider. The service provider has its own environment that services the request. The environment may include a plurality of different devices that coordinate with each other to provide the service. The devices may coordinate over a private network belonging to the service provider. Or, the devices may operate in a cloud or a public network.

Not all application and network requests are legitimate. Often times, these requests are meant to abuse the network or the application. Abuse can come in several forms. For example, some abuse mechanisms try to overwhelm a service so that it cannot service legitimate requests. These are referred to as denial of service requests, whether at the network or application layer. One common mechanism of abuse is referred to as application abuse. An example of this is an a malicious entity fraudulently creating accounts on a service provider platform and then transport unwanted requests across the service provider environment.

Another type of denial of service abuse is a Transport Control Protocol (TCP) SYN flood abuse. Normally when a client attempts to start a TCP connection to a server, the client requests a connection by sending a SYN (synchronize) message to the server, the server acknowledges this request by sending SYN-ACK back to the client, and the client responds with an ACK. A SYN flood abuse works by not responding to the server with the expected ACK code, failing to finish the transaction. Enough of these unfinished transactions can overwhelm a server, rendering it unable to respond to additional requests.

Other abuses may not be trying to bring down a service, but may instead be making requests for other improper purposes. In these abuses, an automated system may be making application requests that, for example, set up fake user accounts and try to entice a user to devolve confidential information, such as her password, credit card information, or Social Security number, or run other scams. These abuses are sometimes referred to as application or application abuse. Often times, these abuse vectors can be concealed inside of an encrypted transport method, such as SSL (Secure Sockets Layer) or IPSec (Internet Protocol Security).

Hardware appliances are available that try to control these type of network and application abuses. Some of these appliances may, for example, operate by maintaining a database of fingerprints of known threats. A database of known threats may be generated by human analysts and include fingerprints identifying different potential threats. As the appliance manufacturer becomes aware of new threats, it may send updates to the database. Using the database, the appliance scans for potential threats.

In addition to scanning against fingerprints, some appliances may check the rate of requests from particular source addresses. For example, an appliance may recognize that requests from a source address increase dramatically or exceed a threshold to detect potential abuses.

While these appliances have advantages, they suffer at least three primary drawbacks. First, they may be impossible to deploy in particular architectures, such as some cloud applications hosted by third parties. Second, they tend to operate in their own silos, often consisting only of their customer network and application transaction data to update threat databases. Operating in their own silos, these appliances may not effectively adapt and react to new threats. Third, they tend to be purpose-built for only a narrow class of abuse.

Limited in these respects, some malicious entities can spread their requests out from a variety of different source addresses and circumvent these security measures. New systems and methods are needed to better protect against these abuses.

BRIEF SUMMARY

In an embodiment, a computer-implemented method detects a network abuse to a service provider environment. In the method, data is collected describing incoming requests from a plurality of different external source addresses to the service provider environment. The collected data is used to compare the incoming requests against a heuristic. When the incoming requests are determined to match the heuristic, the requests, having the plurality of different external source addresses, are from a common source. Finally, the collected data is evaluated to determine that the common source is a potential network abuser of the service provider environment.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

As mentioned above, operating in their own silos, existing network appliances may not effectively adapt and react to new denial of network and application abuse threats. To deal with this, embodiments use data from the service provider environments in concert with external threat data and/or historical data to identify malicious activity, even when using multiple vectors of abuse. More specifically, embodiments collect data on requests to the service provider's environment. They compare the requests against a set of heuristics to determine whether the different requests, being transmitted from or received from different entities, may, in fact be from a common abuse entity. The data is also evaluated against multiple data heuristics to determine whether the source(s) may be attempting or actively abusing the service. If application or network abuse is determined to be in progress, an operator may be alerted or steps to mitigate the abuse may be provided to the administrator or system for manual or automatic mitigation.

Figure 1A:
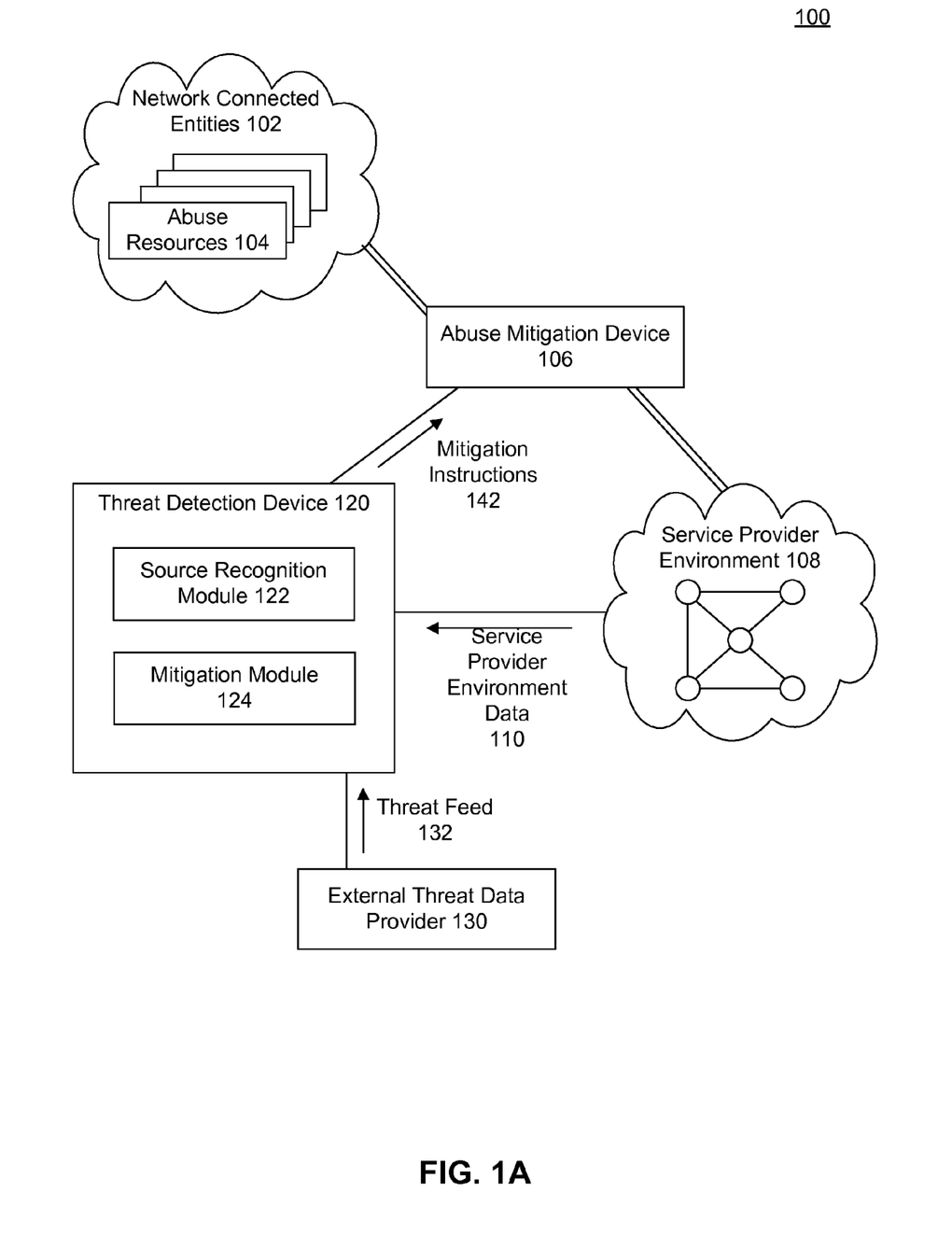
FIG. 1A is a diagram illustrating a system for abuse detection and mitigation, according to an embodiment.

FIG. 1 is a diagram illustrating a system 100 for abuse detection and mitigation, according to an embodiment. System 100 includes one or more network connected entities 102, such as the Internet, and a service provider environment 108. System 100 also includes an attack mitigation device 106, a threat detection device 120 and an external threat data provider(s) 130. Each of these components is described below, and in more detail with respect to FIGS. 2 and 3.

Network connected entities 102 includes a plurality of abuse resources 104. Abuse resources 104 may be a number of different devices with different identities. For example, abuse resources 104 may be addressable on network connected entities 102 by differing Internet Protocol (IP) addresses or other resource identifiers, such as HTTP User-Agents, DNS data, IP routing information, reputation data, etc.

Abuse resources 104 may be computers of or controlled by a malicious person, such as a malicious entity. For example, they may be computing devices that the abuse resource owns, or at least partially controls, for the purpose of enacting harm upon the service provider environment or users thereof. The malicious entity can highjack devices 104 to take part in an abuse by installing a virus or malware. For example, in the SYN abuse described above, the malicious entity can engage a number of different devices 104 to initiated uncompleted TCP sessions by infecting the devices with malware. Or, the malicious entity can engage devices 104 to take part in the abuse using their own call-response protocol. For example, the malicious entity can engage devices 104 to take part in the abuse by sending messages with a fraudulent return address, prompting the devices to reply to the fraudulent return address, which can overwhelm it.

In system 100, abuse resources 104 may be engaged in an abuse of service provider network 108. As discussed above, the abuse may be a denial of service attack targeted at making the service provider unable to service legitimate requests or may be an API abuse that leverages the service provider's APIs for an illegitimate purpose.

Service provider environment 108 may include servers designed to service application requests either on the local service provider environment or multiple service providers associated with the main service provider environment. These service providers may be upstream Internet Providers, Cloud Providers or other services and resources the service provider environment is a customer thereof. Service provider environment 108 may be the environment of a customer of the threat detection device 120. The servers may be reachable from network connected entities 102 using particular destination addresses, such as source or destination IP addresses or hostnames. The IP addresses may be registered on a name service, such as a Domain Name System (DNS) service. Using the DNS service, computing devices may look up the appropriate IP addresses based on a hostname and vice versa.

The servers in service provider environment 108 may be configured to service application requests formatted in particular manner. The function of the application requests can vary widely depending on the service provided. In an example where the service is a social media service, the application requests may create new user accounts, request data, post data to the user's account, or post data to other user's accounts, enabling various users on the social media service to communicate.

According to an embodiment, threat detection device 120 detects on the service provider environment 108 abuses using service provider network data 110 collected from service provider environment 108 and using a thread feed 132 from external threat data provider 130.

Threat detection device 120 includes a source recognition module 122 and a mitigation module 124. Source recognition module 122 determines that a common abuse entity controls abuse resources 104. Abuse resources 104 may try to conceal that they are from a common abuse entity by, for example, using different source addresses, such as different source IP addresses. As discussed in greater detail below, to determine whether a common abuse entity controls the abuse resources 104, source recognition module may evaluate customer or service provider environment data 110 against a heuristic. Threat detection device 120 may further evaluate customer or service provider environment data 110 to determine that the common abuse entity is engaged in an abuse If threat detection device 120 determines that the common abuse entity controlling abuse resources 104 is engaged in a potential abuse, mitigation module 124 determines what, if anything, should be to mitigate it. Mitigation module 124 may specify any mitigation actions on mitigation instructions 142 and send mitigation instructions 142 to attack mitigation device 106.

Attack mitigation device 106 may, for example, be a commonly available or specialized firewall, router, switch, load balancer, distributed denial of service (DDOS) mitigation appliance or other devices to mitigate the abuse. When attack mitigation device 106 receives mitigation instructions 142, it takes action to mitigate the abuse. This may mean blocking certain traffic, such as traffic having certain source IP addresses, or marking certain user accounts as suspect due to anomalous application behavior or threat indicators.

In addition to mitigating attacks, attack mitigation device 106 may collect data about incoming requests, like customer environment data 110 from service provider network 108. The collected data may be sent to threat detection device 120, which uses the data to detect potential network abuses.

Figure 1B:
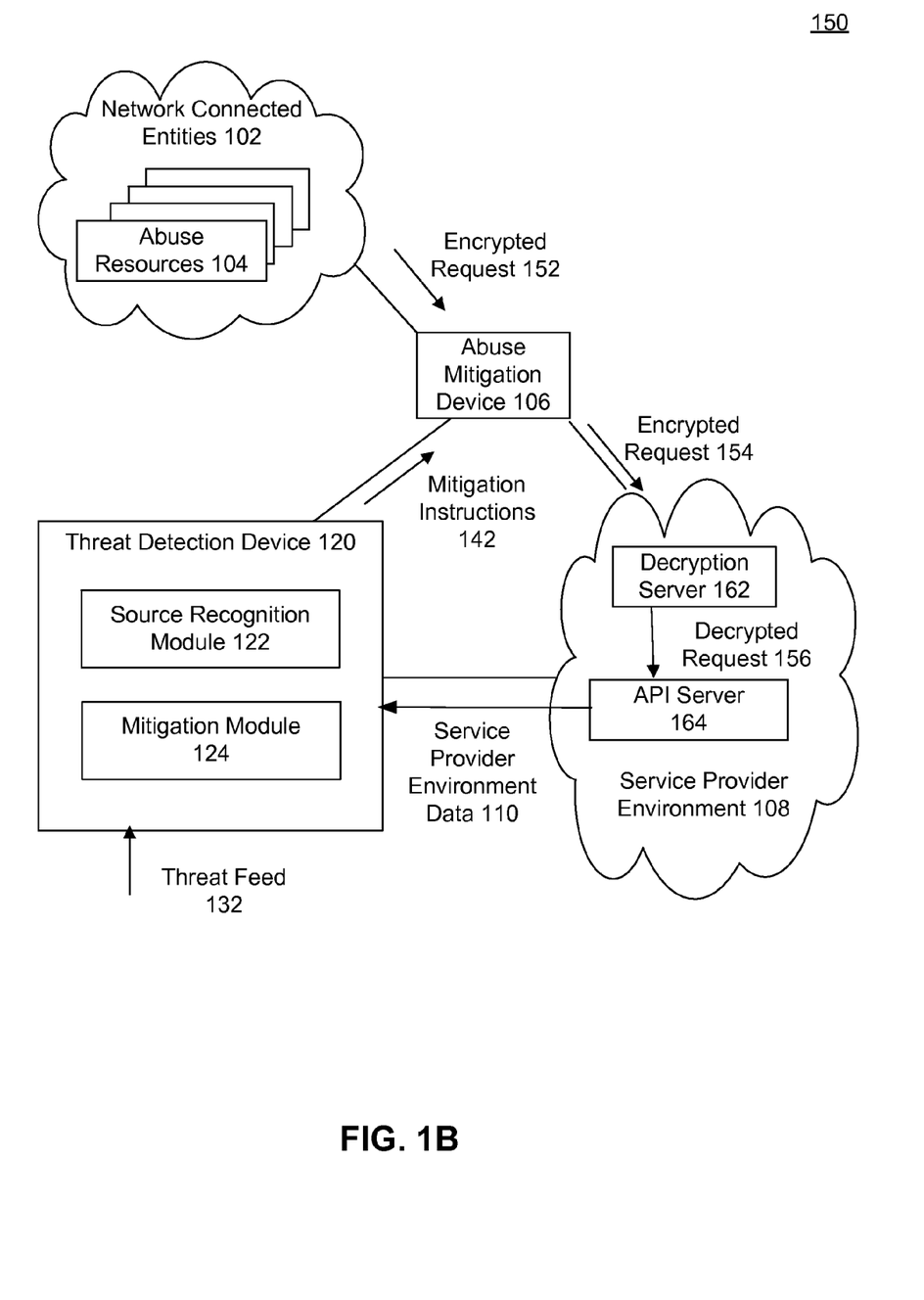
FIGS. 1B-C illustrate additional configurations and features.
Figure 1C:
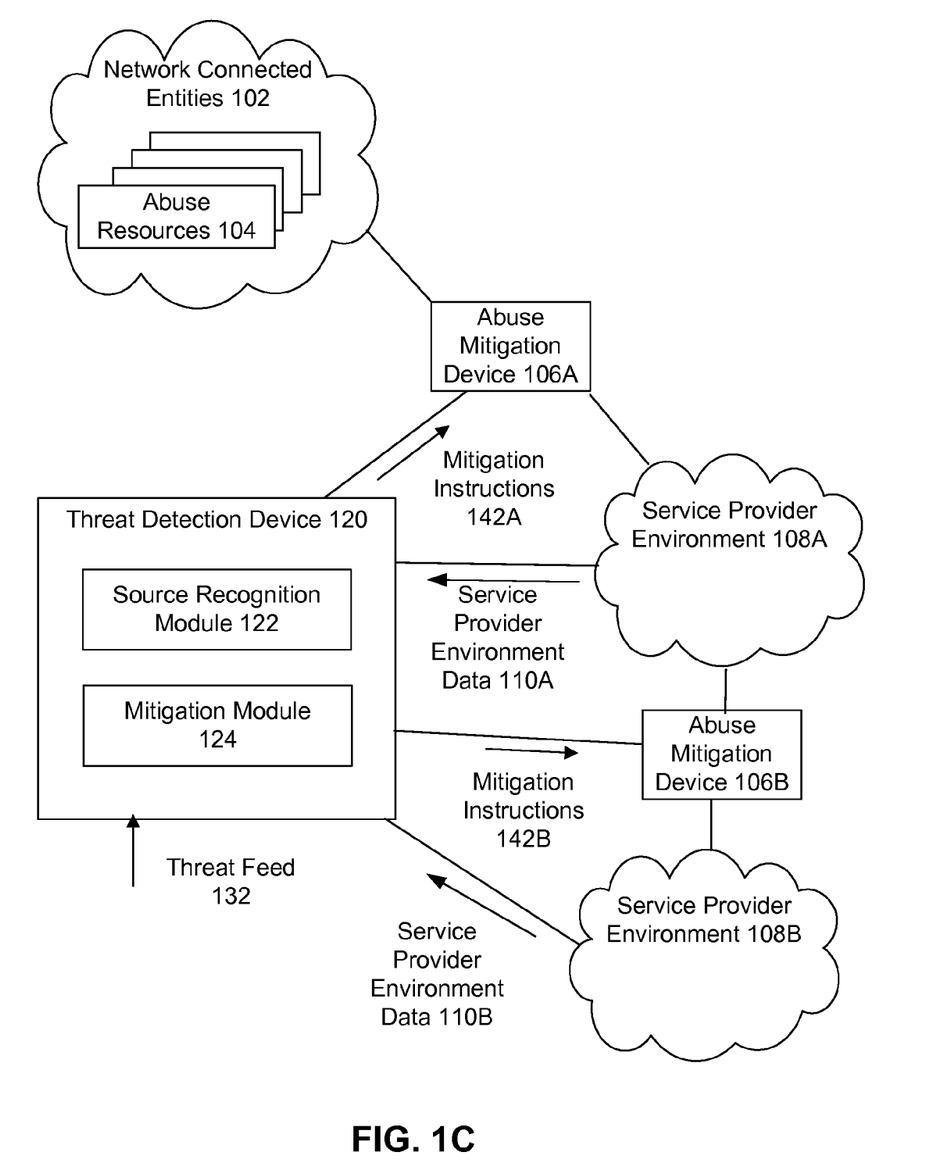

In this way, embodiments detect and mitigate network abuses using service provider environment data. Additional configurations and features are illustrated in FIGS. 1B-C. And other aspects are described in greater detail below with respect to FIGS. 2 and 3.

FIG. 1B shows a system 150 illustrating an embodiment where threat detection device 120 uses data on decrypted requests to detect an abuse and attack mitigation device 108 can block still-encrypted requests.

In system 150, service provider environment 108 includes a decryption server 162 and an API server 164. API server 164 services application requests. Application requests are often encrypted, for example, using a Secure Sockets Layer (SSL)

technology. Decryption server 162 may be an SSL server that decrypts the incoming requests before they reach API server 164. This relieves API server 164 from conducting decryption tasks, which can be computationally expensive.

Because attack mitigation device 106 is upstream from decryption server 162, when network connected entities 102 send an encrypted request 154, encrypted request 154 may reach attack mitigation device 106 before decryption server 162. Attack mitigation device 106 may evaluate the request packet's headers (at, for example, network layers two or three) to determine whether to block or otherwise mitigate the incoming packet. But, because request 154's payload (at, for example, the application layer) is encrypted, attack mitigation device 106 may be unable to effectively evaluate its payload. Absent mitigation instructions identifying the encrypted request 154 as suspect, attack mitigation device 106 may forward the encrypted request 154 onto decryption server 162.

Decryption server 162 decrypts encrypted request 154 and forwards onto API server 164 as decrypted request 156. API server 164 may collect data on decrypted request 156, including its payload, and send the data onto threat detection device 120 as customer environment data 110. The decrypted payload data sent to threat detection device 120 may include information about the application-level API call that would be difficult to collect were the request encrypted. Using this data, threat detection device 120 can make more informed determinations about a potential threat than could be accomplished with a single appliance only looking at encrypted data.

When threat detection device 120 detects a potential threat, it can send mitigation instructions 142 that inform attack mitigation device 106 to block or otherwise mitigate incoming packets having particular header characteristics, such as network layers two or three header characteristics. For example, mitigation instructions 142 may identify particular source IP addresses of suspect packets and instruct attack mitigation device 106 to block those packets. In this way, using threat detection device 120, attack mitigation device 106 can block a potential abuse that may be otherwise undetectable from its position on the network upstream from decryption server 162.

FIG. 1C shows a system 180 illustrating an embodiment where threat detection device 120 uses knowledge of network topology to select one of several attack mitigation devices to mitigate an attack.

System 180 includes two service provider environments—108A and 108B—and two attack mitigation devices—106A and 106B. As mentioned above, each service provider environment 108A-B can include its own network, and that network can forward data onto other connected devices and networks. Network connected entities 102 connects to downstream attack mitigation device 106A, which connects to downstream service provider environment 108A, which connects to downstream attack mitigation device 106B, which connects to downstream service provider environment 108B.

According to an embodiment, threat detection device 120 is aware of this topology and selects where to send mitigation instructions (to attack mitigation device 106A or 106B) based on its knowledge of the topology. Threat detection device 120 may determine the targets of the abuse and may send mitigation instructions to a mitigation device upstream from the targets. In one embodiment, threat detection device 120 may select a mitigation device as close to the targets as possible while still being upstream from the targets. For example, if a threat is only attacking service provider environment 108B, threat detection device 120 may mitigate the attack by sending mitigation instructions 142B to attack mitigation device 106B. Alternatively, if a threat is attacking both service provider environment 108A and service provider environment 108B, threat detection device 120 may mitigate the attack by sending mitigation instructions 142A to attack mitigation device 106A. In this way, threat detection device 120 can efficiently balance mitigation responsibility across a number of devices in a network.

While only two devices and environments are shown in the illustrative example in system 180, a skilled artisan would recognize other devices and environments may be used in a similar manner.

Figure 2:
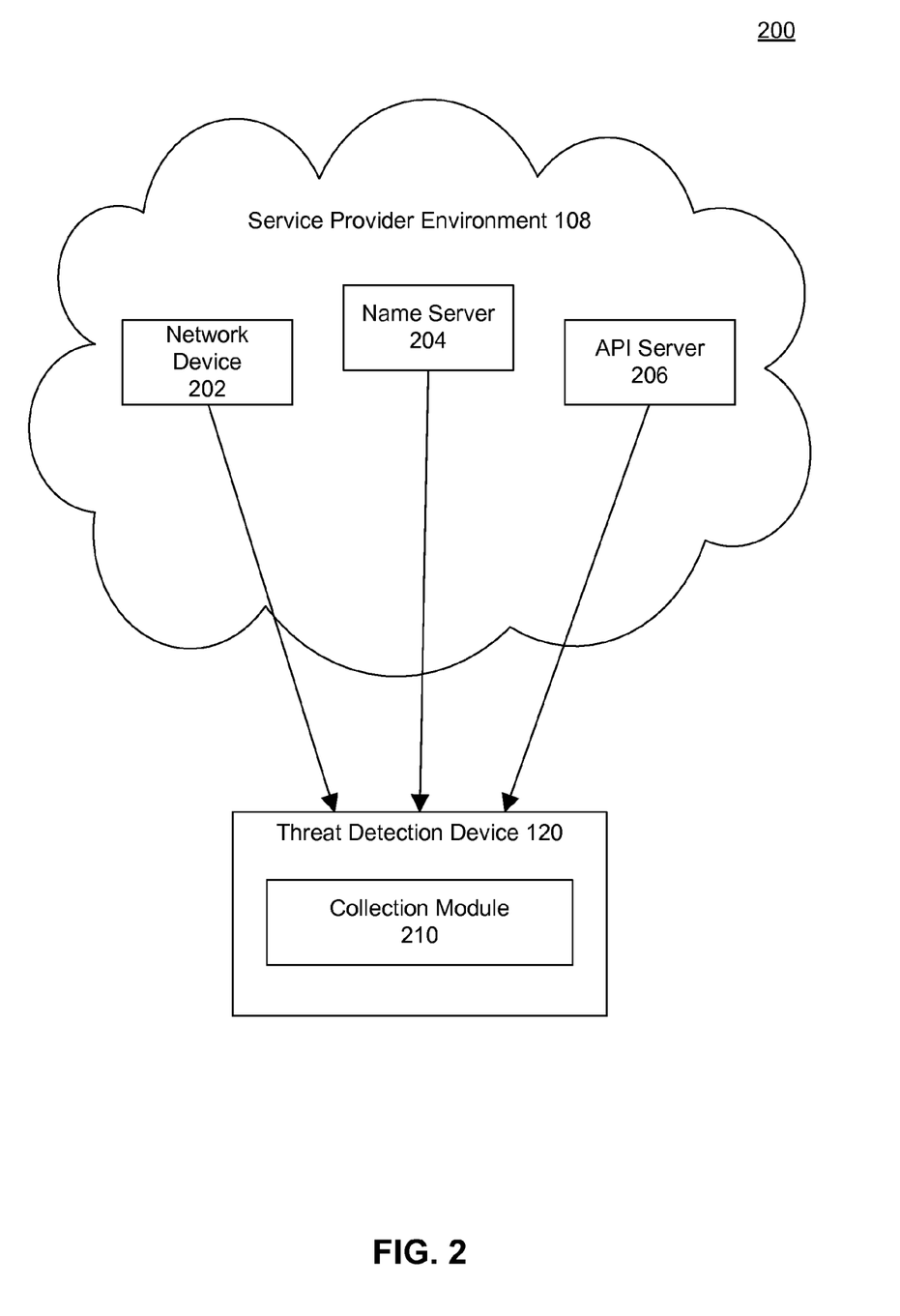
FIG. 2 is a diagram illustrating components of the system in FIG. 1 that collect state from a service provider network for threat detection, according to an embodiment.

FIG. 2 is a diagram illustrating a system 200 that collects data from a service provider network for threat detection. Like system 100 in FIG. 1, system 200 includes service provider network 108 and threat detection device 120.

Threat detection device 120 includes a collection module 210 that collects data from service provider network 108. It collects different types of data from different devices. The data may reflect incoming requests to service provider network 108. The requests may have data at different network levels in the Open Systems Interconnection (OSI) network hierarchy. The requests, for example, may be application-level requests or network-level requests. And, to observe the different levels, collection module 210 may need to access different devices on service provider network 108.

Service provider network 108 has network devices 202, API servers 206, and name servers 204. Network devices 202 may, for example, be switching devices that route a packet from one port of the device to another based on the packet's destination address. The switching devices may operate at layer 2 and the packet may be addressed using a Media Access Control (MAC) address. One widespread example of a layer 2 networking protocol is Ethernet. The switching devices may also operate at a layer 3. These devices, commonly called routers, may route data based on an IP address. The data collected from network devices 202 may, for example, be netflow data or packet capture (PCAP) data.

Netflow data, as the term is used herein, is not limited to data from a particular brand or type of router. The netflow data may include a record for each data flow. Each data flow may be one or more packets in time proximity with one another having a common protocol, and common abuse entity identified via Internet Protocol (IP) addresses and Transport Control Protocol (TCP) or User Datagram Protocol (UDP) ports. When a certain amount of time passes after receipt of a packet having these characteristics, the network device determines that the flow has ended, and if the network device receives any additional packets with these characteristics, the network device regards the packets as belonging to a new data flow and represents them with a new netflow data record. Each netflow record may include the data flow's (1) source and destination IP address, (2) source port and destination UDP or TCP port, (3) type of protocol, (4) start and end times, and (5) size (e.g., number of bytes). In this way, netflow data summarizes certain characteristics of a data flow.

Unlike this summary netflow information, packet inspection or packet capture (PCAP) data can capture an entire packet, and/or create a record of the details of an application or data flow. This may be useful for inspecting the body and payload of a packet and its contents. Network devices 202 may have operating system interfaces that enable this feature. Collecting all packets in this method may be too costly on network and computing resources thus, collection module 210 may sample this data, perhaps only capturing the first packet, or first several packets, in each data flow.

While collection module 210 collects protocol information from the various network layers from network devices 202, collection module 210 collects data from the application layer from API servers 206. The application layer data may include data in the application requests. In the social media service example above, if the application requests are to create new user accounts, the data collected may include the desired user name, password, user-agent, timestamp and source IP address. If the application request is to post new data to the user's account or to another user's account, collection module 210 may collect the data sought to be posted. Further, in the embodiments, data can be obtained from application and IT infrastructure monitoring solutions including logging of various types, syslog, application and programming code management and performance monitoring systems instrumentation and output, and others which could singularly or collectively, provide intelligence data to identify abuse in a service provider environment(s).

Finally, name server 204 may be a Domain Name System server. Consistent with functionality of other external name servers, name server 204 may map hostnames to particular IP addresses and vice versa. In a specific example, name server 204 may map hostnames within the service provider server's domain to specific IP addresses. If a service provider has registered the domain example.com, name server 204 may map hostnames within that domain (e.g., matching *.example.com) to particular IP addresses. From name server 204, collection module 210 may collect data describing hostname lookups within the service provider's domain.

To collect data from network devices 202, API servers 206 and name servers 204, collection module 210 may periodically send requests to those respective devices. Alternatively, those devices may push data directly to collection module 210. The devices may have applications already installed that allow collection module 210 to collect the data. Alternatively an additional module may have to be installed on those devices to observe their behavior and send data back to collection module 210.

In this way, embodiments collect data describing incoming requests into the service provider's environment. Once the data is collected, it is evaluated to detect potential abuses as illustrated in FIG. 3.

Figure 3:
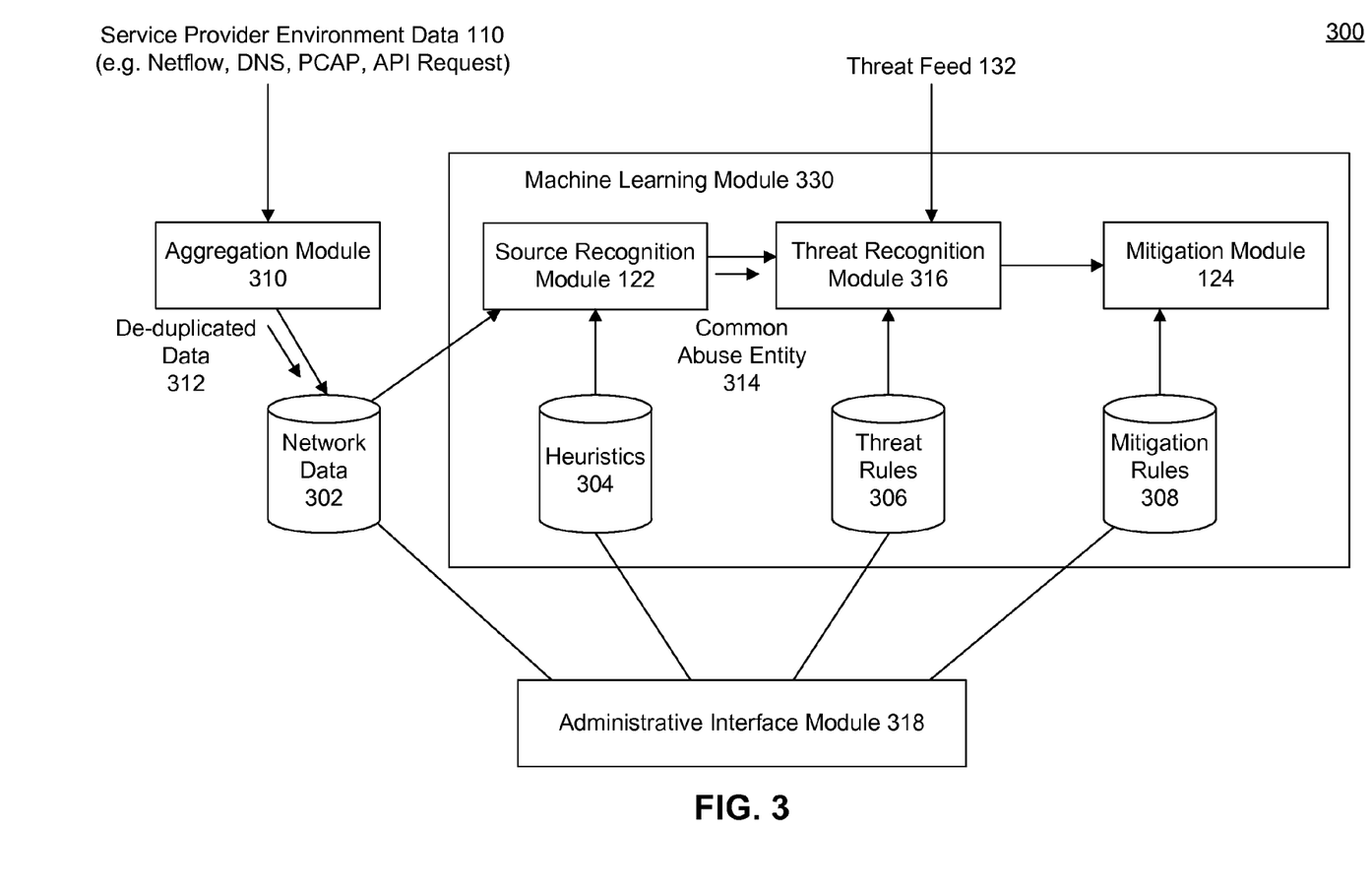
FIG. 3 is a diagram illustrating components of the system in FIG. 1

FIG. 3 is a diagram illustrating a threat detection system 300. In an example, the functionality of system 300 in FIG. 3 may be included in threat detection device 120 in FIG. 1. Like threat detection device 120, system 300 includes source recognition module 122, which is included in a machine learning module 330, and mitigation module 124, and receives service provider environment data 110 and threat feed 132. In addition, system 300 includes an aggregation module 310 and a threat recognition module 316. And, system 300 includes network data 302, heuristics 304, threat rules 306, and mitigation rules 308, which are all accessible using an administrative interface module 318. Each of these components is addressed in turn.

The amount of data collected in the manner described for FIG. 2 can get large quickly. For this reason, aggregation module 310 encodes customer or service provider environment data 110 so that it requires less space before storing it into network data 302. In one embodiment, aggregation module 310 may aggregate the collected data into counts of requests having common characteristics. For example, if five requests were sent from a particular source address in a day and each request was in a different data flow, the netflow data may have five records: one for each data flow. As described above, each record may include a start and end times (or a duration) of the data flow. Aggregation module 310 may aggregate the five records into one stating that on that day a total of five requests were received from that source address.

For application data, aggregation module 310 can aggregate in a similar manner. For example, if a particular source address makes five application calls to create new user accounts, aggregation module 310 may aggregate the five records into one stating that on that day a total of five new user requests were received from that source address.

In addition, data from the different sources or destinations on the customer network may be correlated with one another to reduce or eliminate repetitive data. For example, an application request may appear both as netflow data and as an application request. These records may be combined so that the source address and time of receipt only needs to be stored once. Outside of these specific examples, aggregation module 310 may use other de-duplication and encoding techniques generate de-duplicated data 312 and store it in network data 302.

Machine learning module 330 uses network data 302 to detect new abuse mechanisms. A combination of IP source and destination, application transactional, DNS transactions, network communication patterns, in concert with external data sources will provide the machine learning module 330 with the ability to more accurately detect threats. In particular, machine learning module 330 uses the following data to generate a decision: (i) Service provider environment data; including network, DNS and application transaction requests; (ii) External reputation, and threat, and vulnerability data and historical DNS transactions from providers; and (iii) Data from network and systems security appliances or software within the service provider environment.

Machine learning module 330 uses machine learning techniques to detect and respond to these malicious requests. Example machine learning techniques include decision tree learning, association rule learning, artificial neural networks, inductive logic programming, support vector machines, clustering, Bayesian networks, reinforcement learning, representation learning, similarity and metric learning, and sparse dictionary learning.

Machine learning techniques generally are trained on a set of learned service provider environment data, external data sources, and, after training, reacts to new data based in accordance. For example, machine learning module 330 may be trained with a set of known circumstances that are recognized as being a network abuse and may know how to respond in the event those known circumstances occur. In addition, from those circumstances, machine learning module 330 may generate heuristics and rules that can be used to react to other circumstances.

To detect these types abuses, machine learning module 330 includes source recognition module 122 and threat recognition module 316. Source recognition module 122 analyzes the collected data in network data 302 to compare the incoming requests against heuristics 304. When a plurality of the incoming requests is determined to match the heuristic, source recognition module determines that the requests, having the plurality of different sources, are from a common abuse entity 314. In the example where the respective incoming requests are application calls, the heuristic may be a regular expression rule, or other pattern matching rule, against a field of the application call. In the example where the application call is to create a new user account, the pattern matching rule may be against a requested username. Source recognition module 122 determines whether the application calls match a regular expression or satisfy the pattern matching rule. When the application calls are determined to match a regular expression or satisfy the pattern matching rule, source recognition module 122 determines that the requests, having a plurality of different external source addresses, are from the common abuse entity.

In the example where the data may be netflow data, source recognition module 122 may use other heuristics. For example, the heuristics may map groups of IP addresses to certain known actors. These groups of IP addresses/hostnames may be IP addresses that a service provider assigned to a single person. Or, they may be IP addresses that are assigned in the DNS system to a single domain. When several requests are received from source IP addresses in this group, source recognition module 122 identifies them as being from a common abuse entity. The groups may also be categorized by subnet. In that embodiment, a heuristic may identify a particular subnet as belonging to a common abuse entity. For example, when several different IP addresses have their first 32 bits in common, source recognition module 122 may identify them has coming from a common abuse entity.

Once identified, source recognition module 122 sends common abuse entities 314 to threat recognition module 316. Common sources 314 may identify a group of IP addresses or application requests belonging to each common request.

Threat recognition module 316 evaluates network data 302 to determine whether the common abuse entity is a potential malicious entity of the service provider environment. To determine whether the common abuse entity is a potential malicious entity, threat recognition module 316 can use threat rules 306. Threat rules 306 may specify conditions where the threat recognition module 316 identifies a source as a malicious entity. The conditions may be based on a variety of inputs, including a rate, an external threat feed, and others.

In the rate-based approach, threat recognition module 316 evaluates the collected data to determine a rate of incoming network and application requests from the common abuse entity. Threat recognition module 316 may determine whether the rate of incoming requests, having a particular type (e.g., network or application layer requests and if application, whether it is HTTP or some other protocol) matches a heuristic. The rate may match a heuristic when it exceeds a threshold specified by the heuristic. The threshold may be a fixed value in threat rules 306 or may be based on prior traffic, such as prior traffic from the source. For example threshold may be a certain number of standard deviations away from rates that were previously measured. And, when the rate of incoming requests is determined to exceed the threshold, threat recognition module 316 determines that the common abuse entity is a potential network malicious entity of the service provider environment.

Threat rules 306 may also be based on external threat feed 132. Threat recognition module 316 receives, from external threat feed 132, fingerprint data identifying a suspect source address and determines that the common abuse entity is the potential network malicious entity based on whether the suspect source address from the external data feed belongs to the common abuse entity. Fingerprint data may be stored with threat rules 306 for future use. External threat feed may also include reputation data surrounding different source addresses. The poor reputation data may indicate that others have reported bad conduct of the IP address or other network or resource identifier. The external threat feed and historical DNS heuristics may also be used as a feedback mechanism to train new threat rules 306 in machine learning module 330.

The external threat feed may also include data from news sources (such as a Google News source available from Google Inc. of Mountain View Calif.) and social media sources (such as a Facebook source available from Facebook, Inc. of Menlo Park, Calif.). For example, an uprising in the Middle East may appear as a spike in traffic from a particular geographic area, which the threat rules would otherwise register as an abuse. But, data from these news or social media sources may indicate that it is not an abuse but a wave of legitimate traffic caused by a real-world event.

Finally, the external threat feed may include real-time DNS transaction data. For example, sources that are requesting similar application or network request transactions may be determined as from a common abuse entity. To determine whether sources are requesting similar application or network transactions, the DNS transaction data may be used. In the above examples, in addition DNS heuristics can include the amount of times a domain has had key DNS resource records changed (e.g., frequency of recent changes), their geographic location and any threat data the above heuristics.

In addition to evaluating a rate of the requests, threat rules 306 may also look at other past conduct of the source. For example, in the case of application abuse, threat rules 306 may indicate a potential threat when no prior requests are received from the source and now they are calling applications in a regular pattern.

Finally, threat recognition module 316 may look to the number of IP addresses mapped to a particular domain in the Domain Name System, the geographic origination of source IP addresses, or whether any of the incoming requests has used a fraudulent credit card or having been associated with other type of malicious behavior.

Threat recognition module 316 compares this information or any combination thereof with thresholds and conditions defined in threat rules 306 to determine whether the common abuse entity is a potential malicious entity. Threat recognition module 316 then sends its determination to mitigation module 124.

To account these different factors—e.g., external threat data, rate changes, geographic originating, prior malicious behavior, threat recognition module 316 to take into account a weighted scoring method to determine whether an abuse is taking place and even to signal a type of mitigation. These factors may each receive a different weight and the weighted values may be combined (e.g., by summing) to determine a score. If the score is above a threshold, the common abuse entity is identified as a potential abuser.

In addition, threat recognition module 316 may identify targets of the attack. To identify the target, threat recognition module 316 may look to the destination addresses (e.g., IP addresses) of the packets involved in the attack. In addition to identifying these destination addresses as targets of the attack, threat recognition module 316 may also aggregate the addresses into ranges and extrapolate other destinations that may be targeted using the techniques described above for identifying the source common abuse entity.

In response to the determination that the common abuse entity is a potential distributed malicious entity, mitigation module 124 looks to mitigation rules 308 to determine what action, if any, to take. The mitigation rules 308 may specify certain actions to take in depending on characteristics of the threat or the source. The characteristics of the threat can include, for example, whether it is a rate-based abuse, whether it is an application abuse or denial of service abuse and how it was identified by threat recognition module 316 (e.g., by geographic origination, external threat feed, etc.)

When an abuse is detected, mitigation rules 308 can specify mitigation module to take one of several actions based on the characteristics of the abuse. First, mitigation module 124 sends a message to a specialized software mitigation agent or network component, such as a firewall, router, switch, load balancer or DDOS mitigation appliance, to block traffic from addresses belonging to the common abuse entity.

Second, mitigation module 124 can inform a DNS Bind9 Response Policy Zone to stop lookups of the DNS hostname or domain considered a threat. Third, mitigation module 124 can send a message to an application component to flag accounts the common abuse entity created to mark the accounts as suspicious. Fourth and finally, mitigation module 124 can send to an operator an alert indicating the potential threat, allowing the operator to decide what, if any, mitigating action to take.

Administrative interface module 318 may enable the operator to take select which mitigating action to take. Administrative interface module 318 may be a web portal, command line interface (CLI) or API interface and also enable an operator to observe network data 302 and to specify heuristics 304, threat rules 306, and mitigation rules 308.

When an operator takes an action on a potential threat, that action can be used as feedback into machine learning module 330 for training. The feedback may be used to develop new mitigations rules 308. For example, after an operator manually mitigates a threat a certain number of times, a mitigation rule 308 may be created that automatically mitigates the threat. In this way, by allowing feedback and modification of heuristics 304, threat rules 306, and mitigation rules 308, administrative interface module 318 may enable a user to customize the abuse mitigation strategy.

Figure 4:
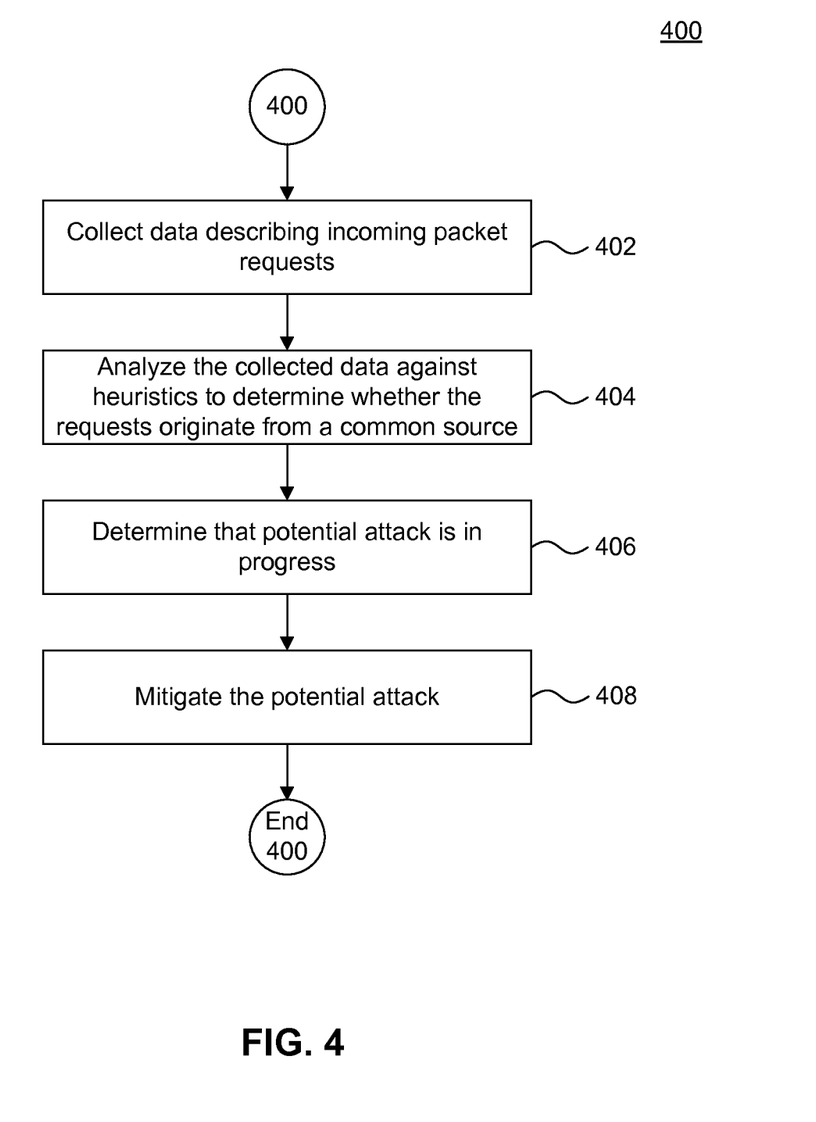
FIG. 4 is a flowchart illustrating a method for abuse detection, according to an embodiment.

FIG. 4 is a flowchart illustrating a method 400 for abuse detection, according to an embodiment.

Method 400 begins at a step 402 by collecting data describing incoming requests from a plurality of different external source addresses to the service provider environment.

At step 404, the collected data is analyzed to compare the incoming requests against a heuristic. For example, when the application calls are determined to match a regular expression, the requests are determined to be from the common abuse entity. When the incoming requests are determined to match the heuristic, the requests are determined to be from a common abuse entity.

At step 406, the collected data is evaluated to determine that the common abuse entity is a potential network malicious entity of the service provider environment. This determination may be made, for example, based on the rate of incoming requests, based on an external threat feed, or other factors.

Finally, at step 408, the abuse is mitigated. This may involve sending an alert to an operator, sending a message to a network component to block network traffic from addresses belonging to the common abuse entity, or sending a message to an application component to flag accounts the common abuse entity created to mark the accounts as suspicious.

Conclusion

Each of the devices and modules in FIGS. 1-3 may be implemented in hardware, software, firmware, or any combination thereof.

Each of the devices and modules in FIGS. 1-3 may be implemented on the same or different computing devices. Such computing devices can include, but are not limited to, a personal computer, a mobile device such as a mobile phone tablet device or laptop device, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for detecting an abuse to a service provider environment, comprising:
 (a) collecting data describing incoming requests from a plurality of different external source addresses to the service provider environment;
 (b) analyzing the collected data to compare the incoming requests against a heuristic;
 (c) when the incoming requests are determined to match the heuristic, determining that the requests, having the plurality of different external source addresses, are from a common abuse entity; and
 (d) evaluating, at least based on a number of domains the common abuse entity hosts, the collected data to determine whether the common abuse entity is a potential abuser of the service provider environment.

2. The method of claim 1, wherein the evaluating (d) comprises:
 evaluating the collected data to determine a rate and type of incoming requests from the common abuse entity;
 (ii) determining whether the rate of incoming requests matches another heuristic; and
 (iii) when the rate of incoming requests is determined to match the other heuristic, determining that the common abuse entity is a potential abuser of the service provider environment.

3. The method of claim 2, further comprising:
 (iv) aggregating collected data into counts of requests having common characteristics, wherein the evaluating comprises determining the rate based on the data aggregated in (iv).

4. The method of claim 1, further comprising:
 (e) receiving, from an external threat feed, fingerprint data; and wherein the evaluating (d) comprises determining that the common abuse entity is the potential abuser based on the external data feed.

5. The method of claim 4, wherein the receiving (e) comprises receiving, from an external threat feed, fingerprint data identifying a suspect source address, and further comprising:
(f) determining that the suspect source address belongs to the common abuse entity, and wherein the evaluating (d) further comprises determining that the common abuse entity is the potential abuser based on whether the suspect source address from the external data feed belongs to the common abuse entity.

6. The method of claim 1, further comprising:
(e) in response to the determination that the common abuse entity is a potential abuser, sending a notification to an operator.

7. The method of claim 1, further comprising:
(e) in response to the determination that the common abuse entity is a potential distributed denial of service abuser, sending a message to a network component to block traffic from addresses belonging to the common abuse entity.

8. The method of claim 1, further comprising:
(e) in response to the determination that the common abuse entity is a potential abuser, sending a message to an application component to flag accounts the common abuse entity created to mark the accounts as suspicious.

9. The method of claim 1, wherein the respective incoming requests are API calls and wherein the analyzing (b) comprises determining whether the API calls match a regular expression, and
wherein the determining (c) comprises, when the API calls are determined to match a regular expression, determining that the requests, having a plurality of different external source addresses, are from the common abuse entity.

10. The method of claim 1, wherein the heuristic has been user-defined in an administrative interface.

11. The method of claim 1, wherein the at least one of the incoming requests includes an encrypted payload, further comprising:
(e) prior to the collecting (a), decrypting, at a decryption server, the encrypted payload, wherein the collecting (a) comprises collecting data describing the payload and the evaluating (d) comprises evaluating the payload decrypted in (e) to determine that the common abuse entity is a potential abuser; and
(f) in response to the determination that the common abuse entity is a potential abuser, sending a mitigation instruction identifying a header of packets originating from a common abuse entity to a mitigation device, upstream from the decryption server, that mitigates abuses from encrypted packets.

12. The method of claim 1, further comprising, in response to the determination that the common abuse entity is a potential abuser:
(e) determining a target of the potential abuse;
(f) selecting at least one of a plurality of mitigation devices in a network topology such that the selected mitigation device is upstream from the target; and
(g) sending, to the selected mitigation device, a mitigation instruction to mitigate an attack from the common abuse entity.

13. The method of claim 12, further comprising wherein the determining (e) comprises determining a plurality of targets of the potential abuse, and wherein the selecting (f) comprises selecting a mitigation device from the plurality of mitigation devices such that the selected mitigation device is upstream from each of the plurality of targets.

14. A system for detecting an abuse to a service provider environment, comprising:
a computing device;
a collection module, implemented on the computing device, that collects data describing incoming requests from a plurality of different external source addresses to the service provider environment;
a source recognition module that (i) analyzes the collected data to compare the incoming requests against a heuristic, and, (ii) when a plurality of the incoming requests are determined to match the heuristic, determines that the requests, having the plurality of different external source addresses, are from a common abuse entity;
a threat recognition module that evaluates, at least based on a number of domains the common abuse entity hosts, the collected data to determine whether the common abuse entity is a potential abuser of the service provider environment.

15. The system of claim 14, wherein the threat recognition module (i) evaluates the collected data to determine a rate of incoming requests from the common abuse entity, (ii) determines whether the rate of incoming requests exceeds a threshold, and (iii) when the rate of incoming requests is determined to exceed the threshold, determines that the common abuse entity is a potential abuser of the service provider environment.

16. The system of claim 15, further comprising:
an aggregation module that aggregates the collected data into counts of requests having common characteristics, wherein the evaluating comprises determining the rate based on the aggregated data.

17. The system of claim 14, wherein the threat recognition module receives, from an external threat feed, fingerprint data identifying a suspect source address and determines that the common abuse entity is the potential abuser based on whether the suspect source address from the external data feed belongs to the common abuse entity.

18. The system of claim 14, further comprising:
a mitigation module that, in response to the determination that the common abuse entity is a potential distributed abuser, sends a notification to an operator.

19. The system of claim 14, further comprising:
a mitigation module that, in response to the determination that the common abuse entity is a potential distributed denial of service abuser, sends a message to a network component to block traffic from addresses belonging to the common abuse entity.

20. The system of claim 14, further comprising:
a mitigation module that, in response to the determination that the common abuse entity is a potential distributed denial of service abuser, sending a message to an application component to flag accounts the common abuse entity created to mark the accounts as suspicious.

21. The system of claim 14, wherein the respective incoming requests are API calls and wherein the source recognition module determines whether the API calls match a regular expression, and, when the API calls are determined to match a regular expression, determines that the requests, having a plurality of different external source addresses, are from the common abuse entity.

22. The system of claim 14, wherein the heuristic has been user defined in an administrative interface.

23. The system of claim 14, wherein the threat recognition module determines whether the common abuse entity is a potential abuser additionally based on:
(i) a geographic origination of the source addresses;
(ii) a reputation data of the source addresses; and (iii) whether any of the incoming requests has been associated with prior malicious financial activity.

24. A non-transitory program storage device tangibly embodying a program of instructions executable by at least one machine to perform a method for detecting abuse, said method comprising:
  (a) collecting data describing incoming requests from a plurality of different external source addresses to the service provider environment;
  (b) analyzing the collected data to compare the incoming requests against a heuristic;
  (c) when a plurality of the incoming requests are determined to match the heuristic, determining that the requests, having the plurality of different external source addresses, are from a common abuse entity; and
  (d) evaluating, at least based on a number of domains the common abuse entity hosts, the collected data to determine whether the common abuse entity is a potential abuser of the service provider environment.

* * * * *